United States Patent
Lundh et al.

(10) Patent No.: US 8,964,551 B2
(45) Date of Patent: Feb. 24, 2015

(54) HSPA RELATIVE BIT-RATE AIMD-BASED QOS PROFILING

(75) Inventors: Peter Lundh, Skåholmen (SE); Lars Blomstergren, Kullavik (SE); Szilveszter Nadas, Budapest (HU)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 324 days.

(21) Appl. No.: 13/257,206

(22) PCT Filed: Mar. 19, 2009

(86) PCT No.: PCT/SE2009/050280
§ 371 (c)(1),
(2), (4) Date: Sep. 16, 2011

(87) PCT Pub. No.: WO2010/107348
PCT Pub. Date: Sep. 23, 2010

(65) Prior Publication Data
US 2012/0008501 A1   Jan. 12, 2012

(51) Int. Cl.
*H04L 12/26* (2006.01)
*H04W 28/22* (2009.01)
*H04L 12/54* (2013.01)
(Continued)

(52) U.S. Cl.
CPC ........... *H04W 28/22* (2013.01); *H04L 12/5695* (2013.01); *H04W 28/02* (2013.01); *H04W 92/12* (2013.01)
USPC ........................................................ 370/235

(58) Field of Classification Search
USPC ............................................... 370/229–237
See application file for complete search history.

(56) References Cited

U.S. PATENT DOCUMENTS

| 6,081,843 A * | 6/2000 | Kilkki et al. ................... 709/232 |
| 2003/0101274 A1 * | 5/2003 | Yi et al. ......................... 709/232 |
| 2006/0159016 A1 * | 7/2006 | Sagfors et al. ................ 370/230 |

(Continued)

FOREIGN PATENT DOCUMENTS

| EP | 1096743 A1 * | 5/2001 | ............. H04L 12/56 |
| EP | 1096743 A1 * | 5/2001 | |

(Continued)

OTHER PUBLICATIONS

IEEE, Prodeedings of the Advanced Industrial Conference on Telecommunications/Service Assurance with Partial and Intermittent Resources Conference/E-Learning on Telecommunications Workshop, "Admission Control for Streaming Services over HSDPA", 2005, total pp. 6.*

(Continued)

*Primary Examiner* — Andrew Chriss
*Assistant Examiner* — Peter Mak
(74) *Attorney, Agent, or Firm* — Coats & Bennett, P.L.L.C.

(57) ABSTRACT

A method is disclosed for controlling, according to an additive increase multiplicative decrease (AIMD) principle, the bandwidth sharing among contending traffic flows over a transport network between a radio network controller and a radio base station. According to the method, a relative bit-rate (RBR) is determined (210) for each traffic flow; and the bit-rates of said traffic flows are controlled (220) such that additive increase operations of said AIMD principle depend on the respective RBR of each traffic flow. Embodiments of the invention strive at supporting Gold, Silver and Bronze HSDPA and/or EUL bit-rate subscriptions over a single TN QoS class.

28 Claims, 11 Drawing Sheets

(51) Int. Cl.
*H04W 28/02* (2009.01)
*H04W 92/12* (2009.01)

(56) References Cited

U.S. PATENT DOCUMENTS

2006/0223585 A1* 10/2006 Legg .............................. 455/560
2007/0070894 A1   3/2007 Wang et al.
2008/0212468 A1*  9/2008 Wigard et al. ................. 370/230
2011/0116406 A1*  5/2011 Racz et al. ..................... 370/252

FOREIGN PATENT DOCUMENTS

| EP | 1976318 A1 * | 10/2008 | |
| EP | 1976318 A1 * | 10/2008 | ............... H04Q 7/32 |
| KR | 20070090466 A | 9/2007 | |
| WO | 01/63855 A1 | 8/2001 | |

OTHER PUBLICATIONS

IEEE, Proceedings of the Advanced Industrial Conference on Telecommunications/Service Assurance with Partial and Intermittent Resources Conference/E-Learning on Telecommunications Workshop, "Admission Control for Streaming Services over HSDPA", 2005, total pp. 6.*

Cai, L. et al. "A QoS-Aware AIMD Protocol for Time-Sensitive Applications in Wired/Wireless Networks." Proceedings of the 24th Annual Joint Conference of the IEEE Computer and Communications Societies, Miami, FL, USA, Mar. 13-17, 2005.

Zhao, Y. et al. "AIMD with Coupon Mechanism." Conference Proceedings of the 2002 IEEE Global Telecommunications Conference, Taipei, Taiwan, Nov. 17-21, 2002.

* cited by examiner

SPI QoS table with 9 virtual QoS levels configured as 1 TN QoS class and 9 Relative Bit-Rates (RBR):

301

| SPI | TN QoS | HSDPA FC ON/OFF | Etc columns | RBR [%] | Note: |
|---|---|---|---|---|---|
| 15 | X | Off | | 100 | Highest prio |
| 14 | X | Off | | 100 | |
| 13 | X | Off | | 100 | |
| 12 | X | Off | | 100 | |
| 11 | X | Off | | 100 | |
| 10 | X | Off | | 100 | |
| 9 | 1 | On | | 150 | Virtual QoS level 9 |
| 8 | 1 | On | | 135 | Virtual QoS level 8 |
| 7 | 1 | On | | 120 | Virtual QoS level 7 |
| 6 | 1 | On | | 120 | Virtual QoS level 6 |
| 5 | 1 | On | | 100 | Virtual QoS level 5 |
| 4 | 1 | On | | 80 | Virtual QoS level 4 |
| 3 | 1 | On | | 80 | Virtual QoS level 3 |
| 2 | 1 | On | | 65 | Virtual QoS level 2 |
| 1 | 1 | On | | 50 | Virtual QoS level 1 |
| 0 | X | Off | | 100 | Lowest prio |

Fig 8

SPI QoS table with 9 virtual QoS levels configured as 3 TN QoS classes and 3 Relative Bit-Rates (RBR):

301

| SPI | TN QoS | HSDPA FC ON/OFF | Etc columns | RBR [%] | Note: |
|---|---|---|---|---|---|
| 15 | X | Off | | 100 | highest prio |
| 14 | X | Off | | 100 | |
| 13 | X | Off | | 100 | |
| 12 | X | Off | | 100 | |
| 11 | X | Off | | 100 | |
| 10 | X | Off | | 100 | |
| 9 | 1 | On | | 150 | Virtual QoS level 9 |
| 8 | 1 | On | | 100 | Virtual QoS level 8 |
| 7 | 1 | On | | 50 | Virtual QoS level 7 |
| 6 | 2 | On | | 150 | Virtual QoS level 6 |
| 5 | 2 | On | | 100 | Virtual QoS level 5 |
| 4 | 2 | On | | 50 | Virtual QoS level 4 |
| 3 | 3 | On | | 150 | Virtual QoS level 3 |
| 2 | 3 | On | | 100 | Virtual QoS level 2 |
| 1 | 3 | On | | 50 | Virtual QoS level 1 |
| 0 | X | Off | | 100 | lowest prio |

*Fig 9*

HSPA RELATIVE BIT-RATE AIMD-BASED QOS PROFILING

TECHNICAL FIELD

The present invention relates to quality of service (QoS) profiling in telecommunication, and more particularly to a method for controlling, according to an additive increase multiplicative decrease (AIMD) principle, the bandwidth sharing among contending traffic flows over a transport network between a radio network controller and a radio base station. The invention also relates to a node in a telecommunication system for performing the method, and to a telecommunication system including such a node.

BACKGROUND

In recent years, the functionality offered by mobile telecommunications systems has been expanded from pure (circuit-switched) voice communication to a variety of services in addition to voice calls. Many of these additional services employ packet-switched data communication between a server and a mobile terminal, or between two mobile terminals, over the mobile telecommunications network and associated wide area networks such as the Internet. For instance, the 3G/UMTS (3rd Generation/Universal Mobile Telecommunications System) architecture involves packet-based communication in accordance with the High Speed Packet Access (HSPA) protocol set, including High Speed Downlink Packet Access (HSDPA) for downlink communication and High Speed Uplink Packet Access (HSUPA), also known as Enhanced Uplink (EUL), for uplink communication. These protocols are defined in the 3rd Generation Partnership Project (3GPP) standards.

In any packet-switched communication system, problems like packet losses or congestion between competing data flows can occur at various locations in the system. Data flow control is therefore provided at several levels in the protocol architecture. For instance, in the 3G/UMTS (3rd Generation/Universal Mobile Telecommunications System) architecture, the Transmission Control Protocol (TCP) may be applied on an upper level between a TCP server and an end-user application in a mobile terminal (user equipment, UE). Radio Link Control (RLC) is applied between a Serving Radio Network Controller (SRNC) and a UE, whereas HSPA Flow Control (FC) is applied to HSPA traffic flows over the Transport Network (TN; Iub) between an SRNC and a Radio Base Station (RBS; Node B)).

For downlink traffic, i.e. HSDPA, the control of radio frame scheduling resides in the Node B:s rather than the SRNC:s. While fix capacity (e.g. 64-384 kbps) can be reserved by way of admission control for traditional Dedicated Channel (DCH) traffic in the radio access network, for HSDPA, per-flow bandwidth reservation is not efficient. This is mainly because the bit-rates can vary considerably between different kinds of traffic flows. Instead, HSDPA flows use a best effort-type of connection over the transport network. When bandwidth reservation is not used, congestion situations can occur both in the transport network and in the air interface. TCP cannot efficiently resolve a congestion situation in the radio access network, because lower layer retransmissions hide the congestion situations from TCP. It is a common scenario that the throughput is limited by the capacity available on the Iub transport network links and not by the capacity of the air interface, and it is important to maintain high efficiency on these high cost links. Thus, HSDPA Flow Control (FC) has been introduced to control the data transfer between the SRNC and Node B over the transport network. While on the air interface it is the task of the air interface scheduler to share the bandwidth among the flows, on Iub it is the task of the FC to provide fair bandwidth sharing among the flows of the same priority.

Similarly, for uplink traffic, i.e. EUL, the uplink radio scheduling resides in the Node B. The EUL traffic has similar properties to that of HSDPA, though it can reach somewhat lower bitrates. For EUL, too, the transport network is a potential bottleneck, and therefore EUL Flow Control is provided.

The likelihood for transport network bottlenecks to occur is increased by the fact that in most instances of cellular systems, the transport network is expensive and is therefore not deployed to a degree where all peak bit-rates fit at the same time. The transport network is often rolled out in a pace, which corresponds to the average traffic growth over time.

Both HSDPA FC and EUL FC handle such occurring transport network bottlenecks by way of rate-based per-flow flow control. Each flow is controlled in an identical way. Rate-based flow control means that the bit-rate of each contending traffic flow is regulated by the FC algorithm, and is used because the lack of sequence numbering and retransmission in the 3GPP standard does not allow a window-based flow control, like TCP. While RLC in the 3G system provides sequence numbering and retransmission functionality, the RLC protocol layer is not terminated in Node B and is, therefore, difficult to use for FC purposes.

The FC algorithms operate according to the Additive Increase Multiplicative Decrease (AIMD) principle, which is well known as such and which ensures convergence to fair bandwidth share among contending traffic flows which are subjected to the same transport network bottleneck (having the same Transport Network layer QoS (Quality of Service) class, and sharing same path in the transport network). QoS differentiation is intended to be solved by Transport Network layer QoS differentiation.

The present inventors have realized that, in situations when the transport network is a bottleneck, it would be beneficial to be able to differentiate between different type of subscriptions, e.g. such that users with a higher-ranked subscription are favored in terms of QoS (Quality of Service) over users with a lower-ranked subscription for the same bottleneck in the transport network. The present inventors have also realized that Transport Network layer QoS (Quality of Service) differentiation as such may not be a sufficient solution.

Therefore, there is room for improvements with respect to these problems.

SUMMARY

It is accordingly an object of the invention to eliminate or alleviate at least some of the problems referred to above.

According to one or more embodiments herein, rate-based per-flow flow control of traffic flows over the transport network may be performed in a way which allows QoS differentiation among traffic flows facing the same transport network bottleneck (e.g. sharing the same TN layer QoS class and the same path between SRNC and Node B). For each traffic flow a relative bit-rate (RBR) is determined, wherein different RBR values may reflect different subscription types. The Additive Increase (AI) part of the flow control algorithm is then modified to depend on the RBR, e.g. by scaling a nominal additive increase bit-rate with the RBR of each traffic flow. By applying the relative bit-rate, the bandwidth share of the flows will converge to a proportional fair sharing instead of (equally) fair sharing. Thereby, QoS differentiation may be achieved even among flows sharing the same TN layer QoS class. Additionally and optionally, to speed up convergence to proportionally fair bandwidth share, the RBR may also be taken into account when determining a starting bit-rate of a newly arrived traffic flow.

One aspect of the present invention therefore is a method for controlling, according to an additive increase multiplicative decrease (AIMD) principle, the bandwidth sharing among contending traffic flows over a transport network between a radio network controller and a radio base station, the method comprising:

determining a relative bit-rate (RBR) for each traffic flow; and controlling the bit-rates of said traffic flows such that additive increase operations of said AIMD principle depend on the respective RBR of each traffic flow.

In one or more embodiments, said determining occurs when a new traffic flow is generated.

Said determining may involve: determining a priority indicator (SPI) of said traffic flow, said priority indicator reflecting a subscription type of a user or user equipment being a party to said traffic flow; and determining the RBR of said traffic flow as a function of the determined priority indicator. To this end, one or more embodiments may further comprise: receiving in the radio base station a High-Speed Downlink Shared Channel (HS-DSCH) data frame in said traffic flow from the radio network controller; deriving the priority indicator (SPI) from a Common Channel Priority Indicator (CmCH-PI) data field in the received HS-DSCH data frame; and determining the RBR of said traffic flow from the derived SPI value.

Alternatively, the priority indicator (SPI) may advantageously be derived from Node B Application Part (NBAP) signaling between said radio network controller and said radio base station.

The RBR of said traffic flow may conveniently be determined from the derived priority indicator (SPI) using pre-stored cross reference data, advantageously in the form of a QoS Mapping Table. The QoS Mapping Table may contain a plurality of RBR values (for instance 3, 4 or 9 RBR values) for a corresponding plurality of values of the priority indicator (SPI) within one TN QoS differentiation class. Another embodiment encompasses more than one TN QoS differentiation class, such that the QoS Mapping Table contains a first plurality of RBR values for a corresponding first plurality of values of the priority indicator (SPI) within a first TN QoS differentiation class, and that the QoS Mapping Table furthermore contains at least a second plurality of RBR values for a corresponding second plurality of values of the priority indicator (SPI) within a second TN QoS differentiation class. Advantageously, the first plurality of RBR values are identical to the second plurality of RBR values. In such a case, the QoS Mapping Table may for instance define 3 different RBR values (representing one each among 3 different values of the priority indicator (SPI)) within each of 3 different TN QoS differentiation classes.

Thus, the determining of RBR for each contending traffic flow, and the controlling of the bit-rates of said traffic flows such that additive increase operations of said AIMD principle depend on the respective RBR of each traffic flow, may typically be performed for traffic flows within the same TN QoS differentiation class.

In one or more embodiments, said additive increase operations of said AIMD principle involve increasing the current bit-rate of each of said traffic flows by a predetermined increment (caLinIncRate; linearIncreaseAbsBitrate), scaled by the determined RBR of the respective traffic flow, so as to obtain proportional fair bandwidth sharing between said traffic flows in a congestion avoidance (CA) state.

Furthermore, one or more embodiments may comprise using the determined RBR for determining an initial bit-rate of a new traffic flow.

The RBR may typically, in one or more embodiments, represent a scale value in the range between X % and Y % of the nominal bit-rate for a traffic flow within a given TN QoS differentiation class, where X>100% and Y<100%. An RBR at the upper range limit X may be used for a highest ranked subscription type, whereas an RBR at the lower range limit Y may be used for a lowest ranked subscription type. In one embodiment, X is about 200% and Y is about 50%; in other embodiments, X and/or Y may have other value(s), and their difference in magnitude may be smaller or larger than for the aforesaid one embodiment.

Advantageously, the method is performed by an HSDPA rate-based per-flow flow controller and/or an EUL flow controller located in said radio base station.

A second aspect of the invention is a node for a telecommunication system, which system includes a radio network controller connected via a transport network to one or more radio base stations, said node comprising a flow controller for controlling, according to an additive increase multiplicative decrease (AIMD) principle, the bandwidth sharing among contending traffic flows over said transport network, said flow controller being configured for performing the method according to the first aspect.

Advantageously, said node is one of said radio base stations.

A third aspect of the invention is a telecommunication system comprising a radio network controller, a transport network and a node according to the second aspect, wherein said radio network controller is connected to said node by said transport network.

Embodiments of the second and third aspects of the invention may generally have the same or directly corresponding features as any of the features referred to above for the first aspect.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Objects, features and advantages of embodiments of the invention will appear from the following detailed description, reference being made to the accompanying drawings, in which:

FIGS. 7-9 illustrate different examples of QoS mapping tables with an additional RBR column.

DETAILED DESCRIPTION

Figure 1:
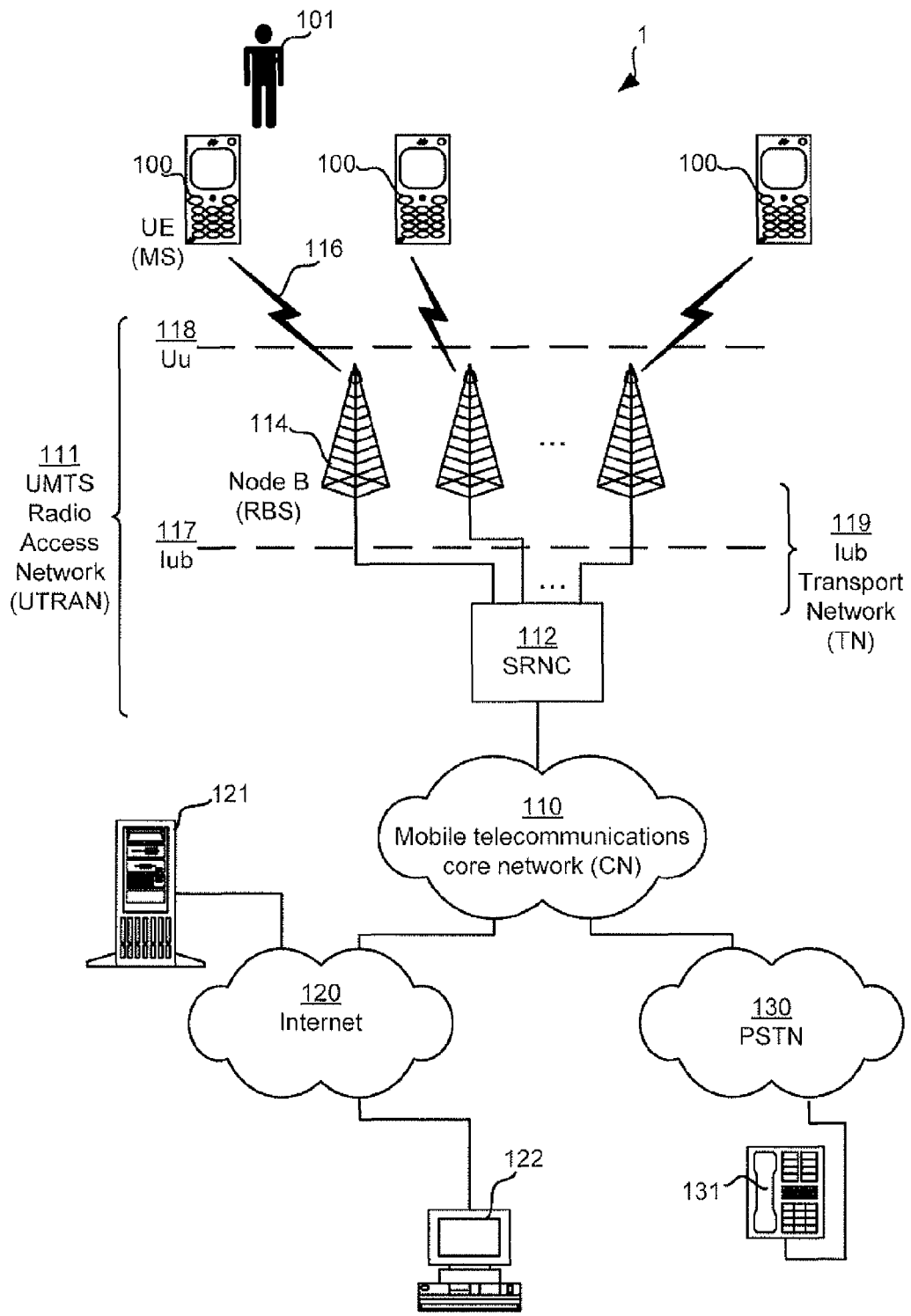
FIG. 1 is a schematic illustration of a non-limiting example of a telecommunication system in which embodiments of the present invention may be exercised.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Before turning to a detailed description of the disclosed embodiments, an exemplifying environment in which they may be exercised will now be briefly described with reference to FIG. 1.

FIG. 1 illustrates a cellular telecommunications system 1 according to the familiar 3G/UMTS system architecture, as defined in the 3GPP standards. Users 101 of user equipment (UE) 100 (i.e. mobile terminals) may use different telecommunications services, such as voice calls, Internet browsing, video calls, data calls, facsimile transmissions, still image transmissions, video transmissions, electronic messaging, and e-commerce. An individual UE 100 connects to a mobile telecommunications core network 110 over a radio link 116 to a radio base station (RBS) 114 (also known as Node B), which in turn is connected to a serving radio network controller (SRNC) 112. A transport network (TN) 119, also known as Iub 117, is provided between the SRNC 112 and RBS 114, and an air interface 118, also known as Uu, is provided between RBS 114 and UE 100. SRNC 112, TN 119 and RBS 114 thus constitute a UMTS Radio Access Network (UT-RAN) 111.

It is to be noticed that the situation in FIG. 1 has been kept on a general level in order not to obscure the disclosure in unnecessary detail. As is well known to the skilled person, there are other elements in a real 3G/UMTS system, not shown in FIG. 1. For instance, in some situations where a connected individual UE 100 is handed over to another cell, a Drift Radio Network Controller (DRNC) may act as a switch to route information between the SRNC and the UE.

A conventional public switched telephone network (PSTN) 130 may be connected to the mobile telecommunications core network 110. Various telephone terminals, including a stationary telephone 131, may connect to the PSTN 130. The mobile telecommunications network 110 is also typically associated with a wide area data network 120, such as the Internet. Server computers 121 and client computers 122 may be connected to the wide area data network 120 and therefore allow communication of packet data with the UE 100. Such packet-based communication may for instance be in accordance with the HSPA protocol set, including HSDPA for downlink communication and EUL (i.e. HSUPA) for uplink communication. For details about these protocols, reference is made to the 3GPP standards.

One or more embodiments herein are schematically described with reference to FIG. 2a and FIG. 2b. These embodiments provides a new type of Quality of Service profiling, where prioritized users may be favored over less prioritized users when it comes to sharing the available bandwidth when contending traffic flows of the users share the same transport network bottleneck. At least one embodiment introduces the notion of relative bitrate (RBR) and uses it to obtain proportional fair bandwidth sharing among contending traffic flows subjected to the same transport network bottleneck and being controlled by Additive Increase Multiplicative Decrease (AIMD)-based flow control, as seen at 200 in FIG. 2a. To this end, an RBR is determined for each contending traffic flow (step 210, FIG. 2a), and the bit-rates of the contending traffic flows are controlled such that additive increase operations of the AIMD-based flow control are made to depend on the respective RBR of each traffic flow (step 220, FIG. 2a).

Figure 2A:
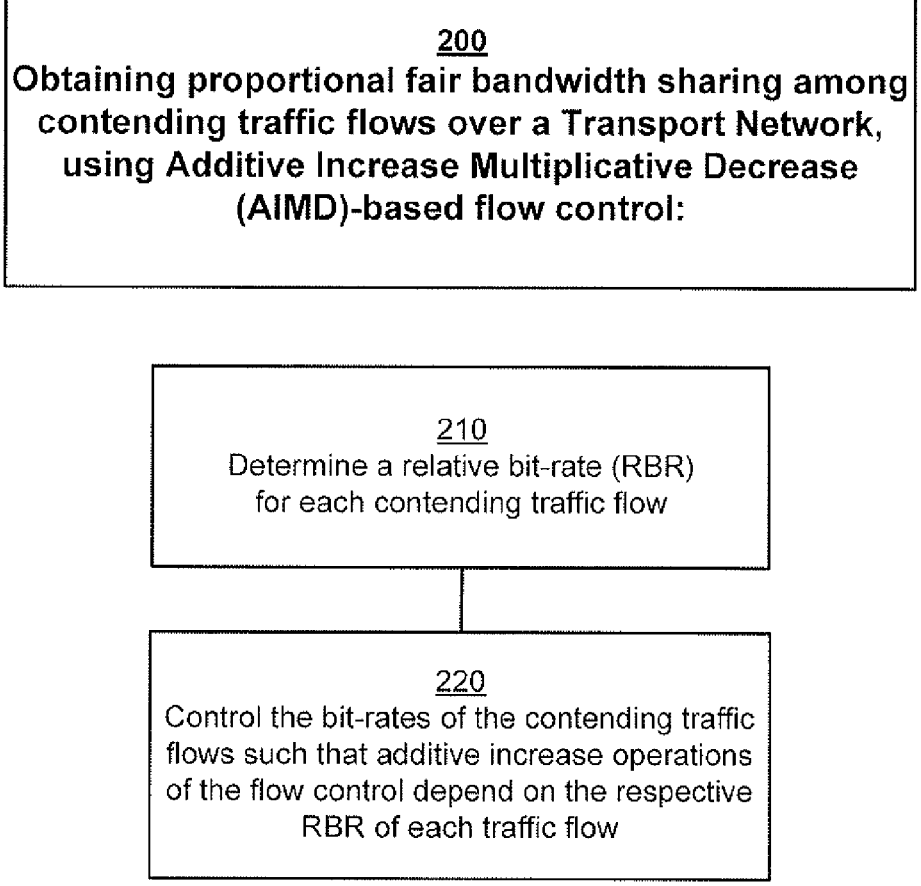
FIGS. 2a and 2b schematically illustrate the inventive concept.
Figure 2B:
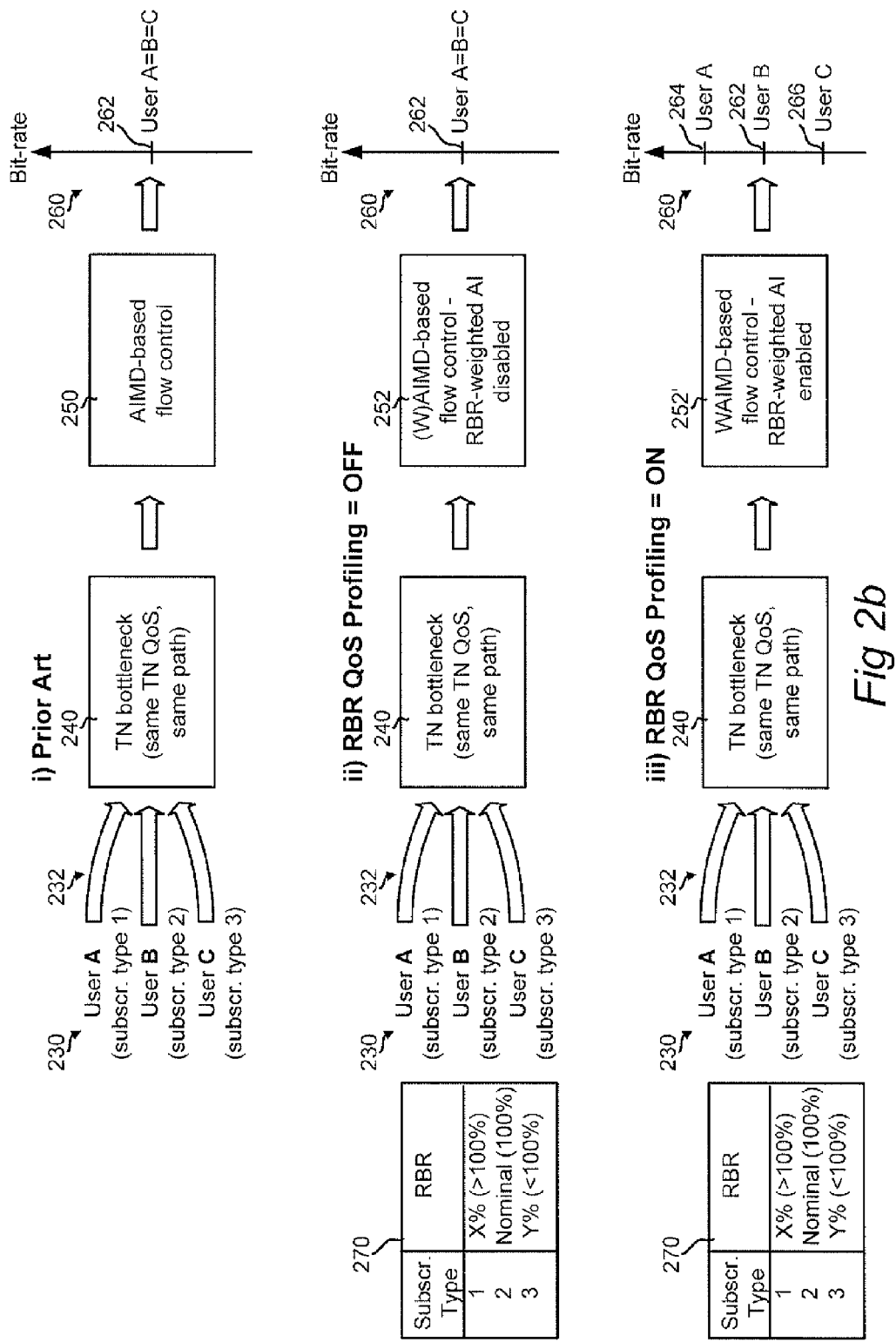

The concept of such relative bit-rate Quality of Service profiling is also demonstrated in FIG. 2b, in comparison with the prior art approach. As seen at i) in FIG. 2b, a number of users A, B, C (at 230) of UE:s 100 (FIG. 1) receives or generates traffic flows 232 which are subjected to the same transport network bottleneck 240. In other words, the contending traffic flows 232 have the same TN QoS differentiation class and traverse the same path in the transport network 119. AIMD-based flow control 250 is provided to handle the congestion between the contending traffic flows 232. The AIMD-based flow control 250 according to the prior art will treat all contending traffic flows 232 equally (albeit individually), by subjecting each flow to additive increase operations with the same amount of bit-rate increase as for the other flows, until congestions occurs, wherein multiplicative decrease operations instead are performed as appropriate. As a result of the AIMD-based flow control 250, for the given TN bottleneck 240, all users A, B, C will—after some iterations of the flow control—arrive at about the same bit-rate 262, as seen at 260 in FIG. 2b—i.e. a fair bandwidth sharing. This will happen even though the users A, B, C may have different priorities in the mind of the network operator, such as subscriptions with different levels of importance (e.g. differentiated by different subscription fees), since the traffic flows 232 are communicated within the same TN QoS differentiation class.

By introducing the notion of RBR, as seen at ii) and iii) in FIG. 2b, proportional fair bandwidth sharing may instead be provided for the traffic flows 232 of the users A, B, C. Here, it is assumed that the user A has a subscription of type 1, which is more prioritized than the subscription type 2 of user B, which in turn is more prioritized than the subscription type 3 of user C. Each subscription type is assigned a respective RBR value, as seen at 270. Therefore, when contention occurs for the traffic flows 232 of users A-C because of the common TN bottleneck 240, the traffic flow for user A will have a higher RBR value (e.g. X %, where X>100), than the traffic flow for user B (e.g. nominal, 100%), whereas the traffic flow for user C will have a lower RBR value (e.g. Y %, where Y<100). The flow control 252' is adapted to perform its Additive Increase operations such that they depend on the respective RBR of each traffic flow, as indicated by the prefix "W" for "Weighted" at iii) in FIG. 2b.

In FIG. 2b, RBR-based QoS profiling functionality can be enabled or disabled. When RBR-based QoS profiling is disabled as seen at ii), the defined RBR values will have no impact on the flow control 252, therefore resulting in fair bandwidth sharing with equal bit-rates 262 for the users A, B, C (like in the prior art situation seen at i)). In other words, when RBR-based QoS profiling is disabled, the RBR values of the traffic flows of users A-C will all be interpreted in the flow control 252 as 100% (i.e. no effect), irrespective of the RBR values defined at 270.

On the other hand, when RBR-based QoS profiling is enabled as seen at iii) in FIG. 2b, the defined RBR values will indeed affect the flow control 252'. Thus, the AI operations of the flow control 252' will depend on the respective RBR of each traffic flow, wherein traffic flows with a higher RBR value (e.g. the flow of user A) will be favored over those with a lower RBR value (e.g. the flow of user B or C). As a result, proportional-fair bandwidth sharing among the contending traffic flows will be obtained. This means that each flow will get a bit-rate which differs relative to the nominal bit-rate (i.e. the bit-rate that would have been obtained by the fair bandwidth sharing scheme of i) or ii)) by an amount which corresponds to the relative difference in RBR. In other word, the bit-rate 264 given to user A compared to the nominal bit-rate 262 offered to user B will approach a difference of (X-100)%, reflecting the difference in RBR between subscription types 1 and 2. Correspondingly, the bit-rate 266 given to user C compared to the nominal bit-rate 262 offered to user B will approach a difference of (Y-100)%, corresponding to the difference in RBR between subscription types 2 and 3.

Embodiments of the rate-based, RBR-dependent AIMD-based per-flow flow control according to the invention will now be described on a general level with reference to FIG. 3, and then in more detail with reference to the remaining figures.

Figure 3:
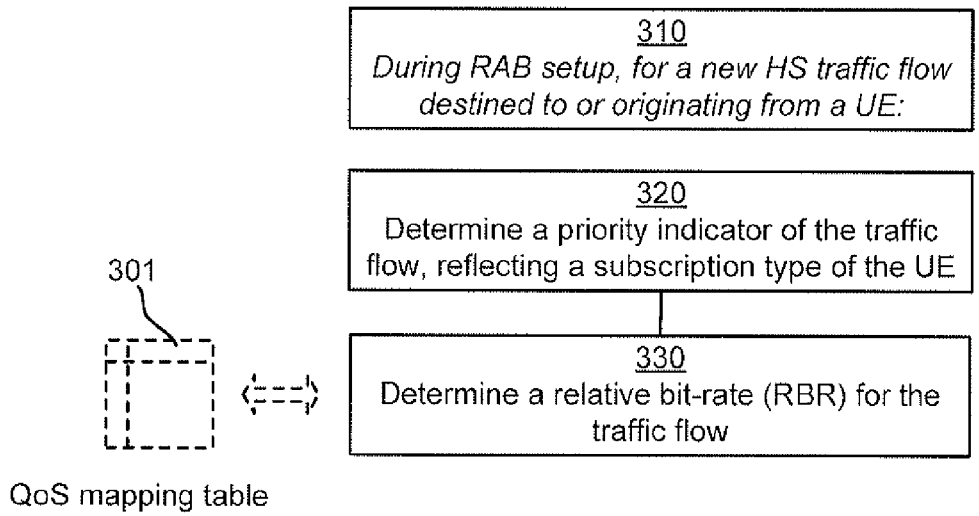
FIG. 3 is a schematic flowchart diagram of HSPA relative bit-rate Quality of Service profiling according to one embodiment.
Figure 3:
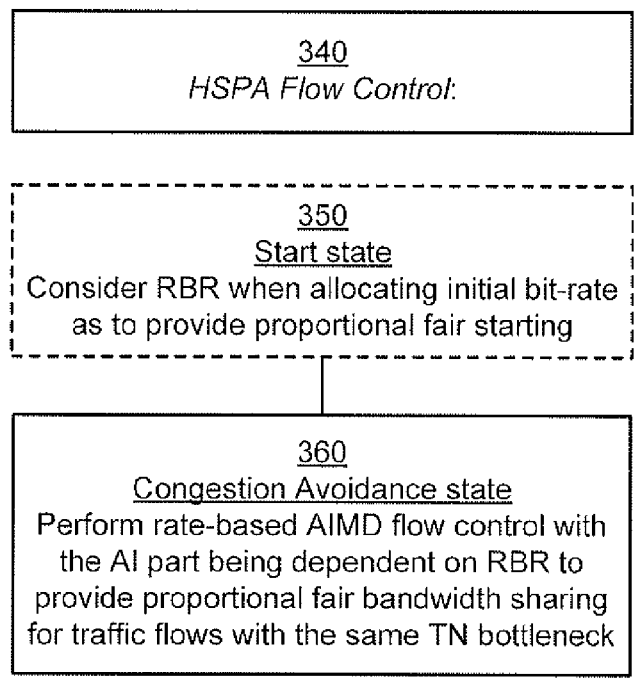

FIG. 3 illustrates the inventive concept of FIGS. 2a and 2b as generally applied in an HSPA network to provide HSPA relative bit-rate Quality of Service profiling, applicable to HSDPA flow control as well as EUL flow control. The functionality of FIG. 3 may be performed in an RBS (Node B) 114 when performing per-flow flow control for the traffic flows to or from an SRNC 112 on an Iub transport network 119 according to FIG. 1.

During the radio access bearer (RAB) setup of a new HS traffic flow, steps 310-330 have the purpose of establishing a relative bit-rate (RBR), which shall reflect the subscription type of the relevant UE and shall be used for the forthcoming flow control of the new HS traffic flow in transport network congestion situations. To this end, the flow control functionality of the RBS 114 determines (step 320) a priority indicator for the new traffic flow from information included in or associated with the new traffic flow, i.e. information received from the SRNC. Then, in step 330, an RBR value is determined for the new traffic flow by means of the priority indicator, for instance by reading a cross-reference table 301 or by calculations based on internal system constants and variables. These and other particulars of how steps 320 and 330 may be implemented in different embodiments will be returned to later in this document.

HSPA flow control 340 is then performed by the RBS 114 upon the traffic flow in question. As seen in step 360, the RBR value determined in steps 310-330 will be used in a congestion avoidance state, where rate-based AIMD flow control is performed with the AI part of the AIMD flow control being dependent on the RBR value, as described above with reference to situation iii) in FIG. 2b. In this way, proportional fair bandwidth sharing may be obtained with respect to all traffic flows experiencing the same TN bottleneck, so that UE:s with higher-ranked subscription types will be favored, in terms of the bandwidth share, over UE:s with lower-ranked subscription types.

Optionally, as indicated in step 350, the RBR value determined in steps 310-330 may also be used during an earlier stage of the HSPA flow control for the new traffic flow in question by considering the RBR value when calculating an initial bit-rate for the new traffic flow. This will provide a proportional fair starting for the new traffic flow, again in effect favoring higher-ranked subscription types over lower-ranked subscription types.

Figure 4:
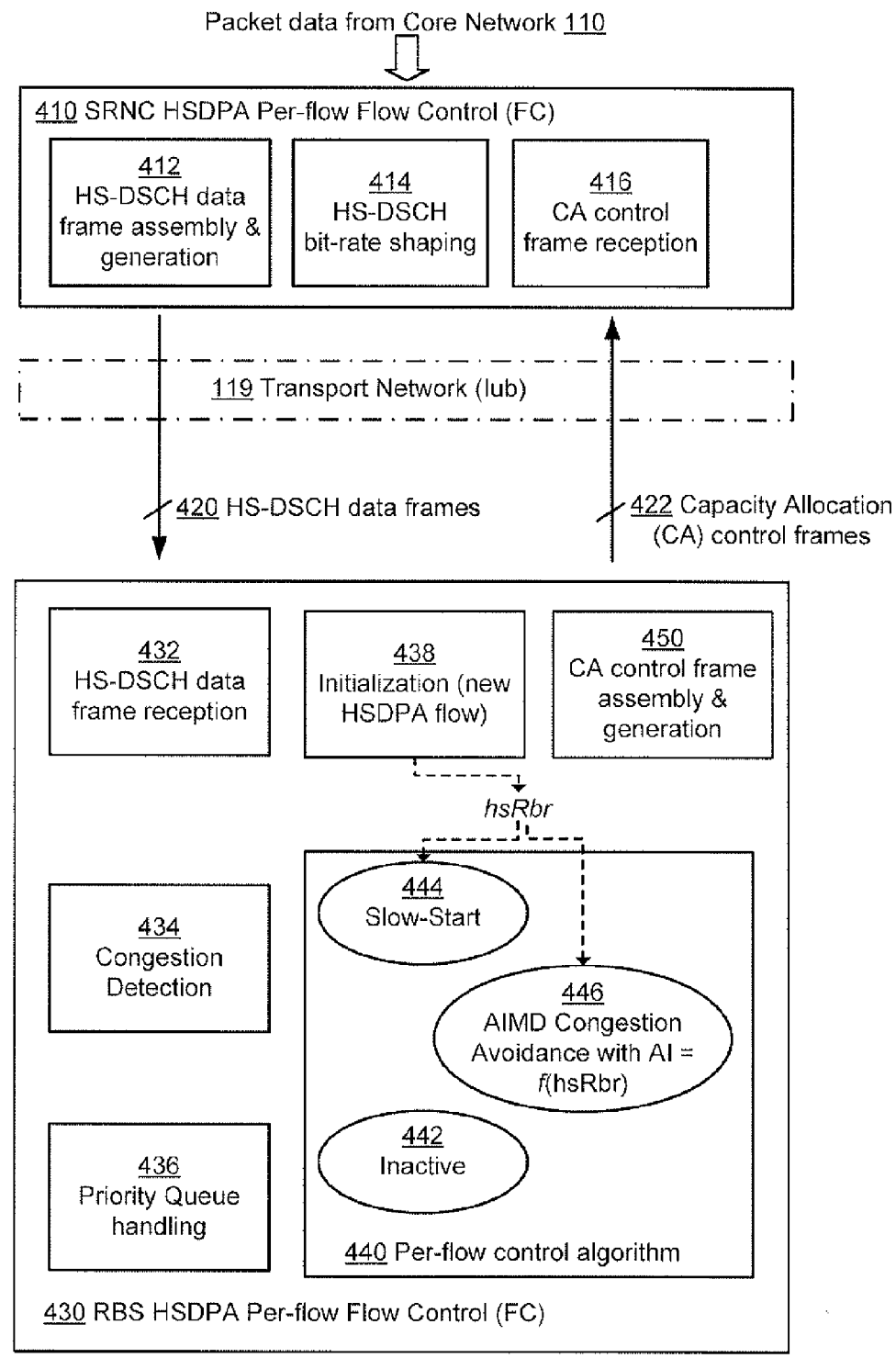
FIG. 4 discloses flow control in an HSDPA transport network according to one embodiment.
Figure 5:
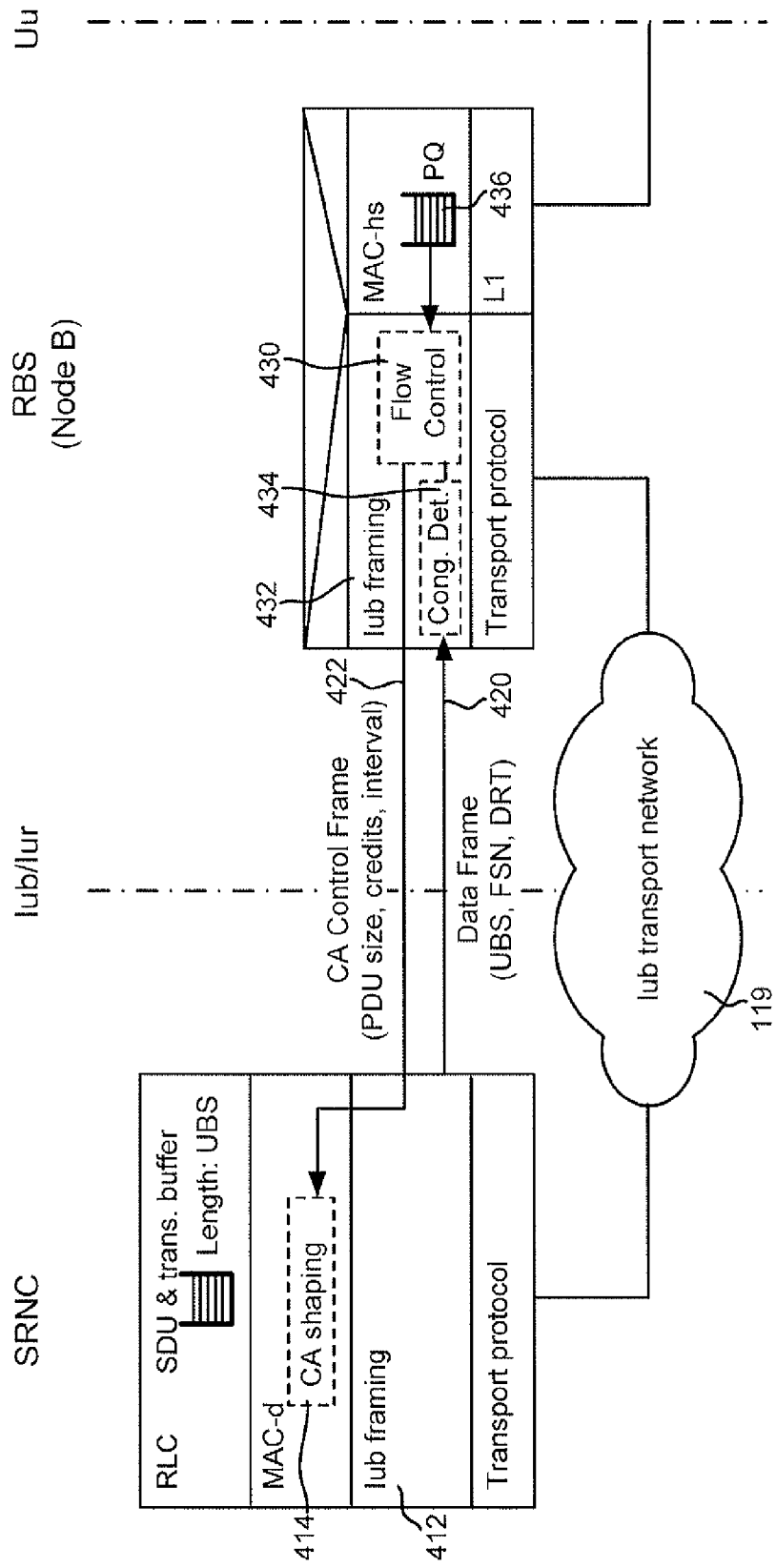
FIG. 5 illustrates an HSDPA flow control architecture and protocol stack.

Reference is now made to FIG. 4 which illustrates the main functional modules which are involved in HSDPA transport network flow control, i.e. for downlink HS traffic in the form of High-Speed Downlink Shared Channel (HS-DSCH) data frames 420 across the transport network 119 between SRNC 112 and RBS (Node B) 114. Correspondingly, FIG. 5 illustrates the protocol stacks involved, which are well known per se. Therefore, for further details about these, reference is made to the available literature, for instance "Szilveszter Nadas, Zoltan Nagy, Sandor Racz and Sandor Molnar "Providing congestion control in the Iub Transport Network for HSDPA", 2007, IEEE Globecom 2007".

As seen in FIG. 4, the RBS part 430 of the HSDPA flow control receives HS-DSCH data frames 420 (module 432) and keep outgoing priority queues (module 436) appropriately filled for further transport towards the air interface (Uu) 118. A module 434 detects HSDPA traffic congestions in the transport network (and in the air interface 118). The traffic congestions may be due to e.g. destroyed, lost or dynamically delayed data frames. An HSDPA traffic flow is handled by a per-flow control algorithm 444 generally having three main states: Inactive (442), Slow-Start (444) and Congestion Avoidance (446). First, however, an initialization state 438 determines the afore-mentioned RBR value for a new HSDPA traffic flow, denoted as hsRbr in FIG. 4. Further details of this initialization will follow.

For the purpose of keeping the priority queues 436 appropriately filled, the per-flow control algorithm 440 can, in each of its states 442-446, decide upon a Capacity Allocation (CA) bit-rate which is to be applied by the SRNC for the forthcoming HS-DSCH data frames 420 to be sent therefrom. To this end, CA control frames 422 are transmitted from the RBS to the SRNC. Upon receipt of such a CA control frame (module 416), the SRNC part 410 of the HSDPA flow control performs CA shaping (module 414) which will accordingly adjust the HSDPA bit-rate used by a HS-DSCH data frame assembly & generation module 412 for forthcoming HS-DSCH data frames 420, until further notice is given from the RBS part 430 in the form of a new CA control frame for the traffic flow in question.

The CA bit-rate is generally controlled by the per-flow control algorithm 440 as follows. At Initialization 438, the CA bit-rate is set to an initial (low) bit-rate for a new traffic flow. Then, during Slow-Start 444, the CA bit-rate is increased from a calculated start point (based on the initial CA bit-rate), until congestion is detected.

Since the flow control is per-flow, each HSDPA flow is handled separately. One HSDPA flow does not know if there are other HSDPA flows in the system or not. Therefore, as the CA bit-rate is increased for each existing flow, and/or as new flows are added, congestion will occur on the traffic network for traffic flows using the same traffic network resource (TN layer QoS class, and path).

In the Congestion Avoidance state 446, the per-flow control algorithm 440 applies the AIMD principle to handle congestions. The AIMD principle is believed to be well known per se to a man skilled in the art and can be summarized as follows. Upon detected congestion, each contesting HSDPA flow decreases its CA bit-rate by a certain percentage, such as for instance 20%—the Multiplicative Decrease (MD) part. Then follows the Additive Increase (AI) part, involving AI operations according to which each of the flows is allowed to increase its CA bit-rate by adding a certain bit-rate increment (commonly represented by a system constant caLinIncRate), e.g. +40 kbps. The conventional AI operation can be expressed as $$CA\ \text{bit-rate} = CA\ \text{bit-rate} + caLinIncRate$$

Conventionally, for the AI part, the same bit-rate increment (value of system constant caLinIncRate) has been applied to all HSDPA traffic flows sharing the same transport network bottleneck (cf situation i) in FIG. 2b). Such contending HSDPA traffic flows will after a number of iterations share the transport network bandwidth in a fair way.

Following the inventive concept, however, the AI part of the AIMD Congestion Avoidance principle is modulated by the determined RBR for each traffic flow, so that each contending HSDPA traffic flow will be subjected to an Additive Increase which depends on its RBR and, ultimately, the subscription type of the UE to which the HSDPA traffic flow is destined (cf situation iii) in FIG. 2b). Thus, the WAI (Weighted Additive Increase) operation performed in state 446 of FIG. 4 and in step 360 of FIG. 3 can be expressed as:

$$CA\ bit\text{-}rate = CA\ bit\text{-}rate + hsRbr*caLinIncRate,$$

where, as previously mentioned, hsRbr is a system variable holding the RBR value determined for the traffic flow in question in state 438 of FIG. 4 and step 330 of FIG. 3.

Particulars about how the RBR is determined (steps 320 and 330 of FIG. 3) and how it may be used in the calculation of the initial bit-rate (step 350 of FIG. 3) according to some embodiments will now be explained.

In one HSDPA embodiment, the system handles RBR-based QoS profiling for three different subscription types, Gold, Silver and Bronze. These subscription types are mapped by the core network 110 into different predetermined values of a Scheduling Priority Indicator (SPI), which holds one column in a QoS Mapping Table held by the SRNC and by the RBS. As is well known per se, when core network 110 sets up a connection in UTRAN 111 (cf step 310 in FIG. 3), various RAB attributes are set up and mapped to 16 different SPI values from 0 to 15, where the higher SPI values typically indicate traffic of higher priority and the lower SPI values typically indicate less prioritized traffic. In this embodiment, after having determined the subscription type for a new HS traffic flow, the core network 110 maps a Gold user to SPI 4, a Silver user to SPI 3, and a Bronze user to SPI 2. The SPI is then communicated to the SRNC 112 and RBS 114 in known ways, e.g. via Radio Access Network Application Part (RANAP) signaling between core network and SRNC, and Node B Application Part (NBAP) signaling between SRNC and RBS. The SPI value will also typically be written to a Common Channel Priority Indicator (CmCH-PI) data field of HS-DSCH data frames 420 which are communicated to the RBS.

Thus, the RBS 114 is able to determine the SPI value spi for a new HS traffic flow (cf step 320 of FIG. 3), either from NBAP signaling with the SRNC, or by reading the CmCH-PI. The RBS has access to the following parameters (with exemplifying parameter values):

| | |
|---|---:|
| schWeight for SPI = 4 (Gold) | 450 |
| schWeight for SPI = 3 (Silver) | 300 |
| schWeight for SPI = 2 (Bronze) | 200 |
| schSilverSPI (an SPI reference pointer for Silver) | 3 |
| schWeightRbrFactorGold | 2.00 |
| schWeightRbrFactorSilver | 1.50 |
| schWeightRbrFactorBronze | 1.00 |
| hsRbrMax (safety max value for RBR) | 2.00 |
| hsRbrMin (safety min value for RBR) | 0.20 |

Then, the algorithm below is executed, having the following basic principle:

Extract SPI value for the HS flow being set up.
Calculate a normalized RBR for Gold or Bronze first (hsRbrNorm). This means that Silver RBR gets 100% and that the Gold and Bronze related RBR values are relative to that 100% value.
Then limit the RBR values range in order to not get a too low or a too high value, which might be unhealthy for the HSDPA Flow Control algorithm.
Then use the interface variable hsRbr in the HSDPA Flow Control.

The output from this algorithm is an RBR value which in normal cases (using schWeight default values) deviates from 100% only for Gold (SPI=4) and Bronze (SPI=2) users. For all other users (SPI values) the RBR value shall be 100%, i.e. for Silver and other SPI values. In other words: RBR output shall be 100% for the following SPI values in normal cases: 0, 1, 3, 5, 6, 7, 8, 9, 10, 11, 12, 13, 14, 15.

---

Algorithm "Determine RBR"
    hsRbrNorm = 1.00
    IF spi = schSilverSpi +1 {Gold user} THEN
        hsRbrNorm = (schWeight(schSilverSpi) +
        (schWeight(spi) − schWeight(schSilverSpi) ) *
        schWeightRbrFactorGold) / schWeight(schSilverSpi)
    End IF
    IF spi = schSilverSpi −1 {Bronze user} THEN
        hsRbrNorm = (schWeight(schSilverSpi) −
        (schWeight(schSilverSpi) − schWeight(spi) ) *
        schWeightRbrFactorBronze) / schWeight(schSilverSpi)
    End IF
    IF HsRbrQosProfActive {when the feature "HSDPA RBR
    QoS Profiling feature is active, then an RBR value shall be
    calculated, else not}
    THEN
        hsRbr = min( hsRbrMax, max( hsRbrMin, hsRbrNorm ) )
    ELSE
        hsRbr = 1.00
    End IF
    Forward the hsRbr interface variable to the HSDPA flow
    control algorithm for the HS traffic flow in question.
End of algorithm

---

The parameter values listed above will, when subjected to the afore-described algorithm, yield the following results.

| Subscription | SPI | schWeight | hsRbr [%] |
|---|---|---|---|
| Gold | 4 | 450 | 200 |
| Silver | 3 | 300 | 100 |
| Bronze | 2 | 200 | 50 |

In other words, the result is a factor 4 bit-rate difference between a Gold user and a Bronze user.

As previously mentioned, this embodiment also uses the opportunity to consider the RBR when calculating the initial CA bit-rate according to the following principle. When the initial CA bit-rate is to be calculated for a new HS traffic flow, a group of currently active HS traffic flows is considered. The active HS traffic flows in this group are flows which share the same TN bottleneck as the new HS traffic flow, and which are in the aforementioned Slow-Start or Congestion Avoidance states 444, 446. Depending on implementation, the group may consist of all active flows in one of the cells handled by the RBS 114, all active flows handled by one HS transmitter (TX) module (handling several cells) in the RBS 114, or even all active flows handled by the entire RBS 114.

A normalized average CA bit-rate caAvgNormBitrate is calculated for the group of active HS traffic flows, i.e. with compensation for their RBR values so that the calculated average is not affected by these RBR values. Then, the initial CA bit-rate for the new HS traffic flow may be calculated by weighting the calculated average CA bit-rate caAvgNormBitrate with the RBR hsRbr of the new HS traffic flow as determined above, i.e. by calculating the initial CA bit-rate as hsRbr*caAvgNormBitrate. However, due consideration is given to various limits in the system, so that the initial CA bit-rate will not exceed appropriate maximum bit-rate values on the Iub interface 119 or Uu interface 118, nor fall below an appropriate minimum bit-rate value. The skilled person will understand that such appropriate maximum and minimum bit-rate values for delimiting the initial CA bit-rate assigned to the new HS traffic flow will have to be determined in view of the actual implementation.

By considering the RBR when allocating the initial bit-rate, proportional fair starting may be obtained.

In the HSDPA embodiment described above, RBR-based QoS profiling is optional; either a system constant or a MOM attribute controls whether it shall be applied or not (cf situations iii) and ii) in FIG. 2b). If not, then there is no effect from RBR on neither the initial bit-rate, nor the AI part in Congestion Avoidance. For instance, since Silver is the default user and yields RBR=1.00, there will be no effect from hsRbr on the calculation of caLinIncRate, when RBR-based QoS profiling is disabled, since this will yield a simple multiplication by 1.00 that, in effect, changes nothing.

Other, more flexible HSDPA embodiments will now be briefly described. In these embodiments, the existing QoS Mapping Table in the RBS (cf 301 in FIG. 3) is expanded by the introduction of a new column for RBS. Conveniently, also the SRNC holds such a QoS Mapping Table with an identical RBS column.

These alternative embodiments are advantageous for several reasons:
- RBR values can be conveniently determined by reference to the QoS Mapping Table, using SPI as index. (As with the first embodiment, SPI may be determined via the NBAP protocol communication between SRNC and RBS at RAB setup and/or by reading the SPI value from the CmCH-PI data field of HS-DSCH data frames 420 which are communicated to the RBS).
- It is possible to use other SPI values than SPI 4, 3 and 2.
- It possible to use any number of SPI values for Interactive flows using different RBR values, i.e. not limited to three SPI values.
- Many of the system constants and variables used in the first embodiment may be dispensed with.
- Also, licence control is advantageously supported.

Once determined by reference to the QoS Mapping Table 301, the HSDPA per-flow flow control may use the RBR value hsRbr in the same or corresponding manner as has been described above for FIG. 4, i.e. scaling the additive increment caLinIncRate with hsRbr when increasing the CA bit-rate in the AI part of the AIMD functionality in the Congestion Avoidance state. Further, the optional influence of hsRbr on the initial CA bit-rate may also be used.

Figure 7:

FIG. 7 discloses a first example of a QoS Mapping Table 301 in the RBS with an additional RBR column. In this example, the Gold, Silver and Bronze subscription differentiation of the first embodiment is supported by the QoS Mapping Table 301, using the SPI values 4, 3 and 2, for the same TN QoS differentiation class (denoted "Interactive" in FIG. 7). The same RBR values as for the first embodiment are used; it is however apparent that other RBR values and other SPI values can be used alternatively.

FIG. 8 shows a second example of a QoS Mapping Table 351 in the RBS with an additional RBR column. Here, 9 virtual QoS levels are configured as 1 TN QoS differentiation class (class 1) and 9 Relative Bit-Rates (RBS), ranging from 150% to 50%.

FIG. 9 shows a third example of a QoS Mapping Table 301, where instead 9 virtual QoS levels are configured as 3 TN QoS differentiation classes (classes 1, 2 and 3) and 3 Relative Bit-Rates. When using several TN QoS differentiation classes like in this embodiment, it is possible to let the different TN QoS differentiation classes represent different TN availability classes, for instance by using TN QoS 1 for ATM or IP based TN with TN redundancy (i.e. high availability), TN QoS 2 for ATM or IP based TN without TN redundancy, and TN QoS 3 for low-cost xDSL TN towards RBS, such as ADSL lines (i.e. low availability). This means that within each TN QoS differentiation class/TN availability class, the system may offer RBR-based QoS profiling for different subscription types, such as the Gold, Silver and Bronze subscription types referred to previously in this document.

It is evident that the alternatives are almost unlimited for embodiments making use of a QoS Mapping Table with an additional RBR column.

The RBR QoS profiling principle which has been described above for the HSDPA embodiments may be used also in EUL embodiments, as will now be described with reference to FIGS. 6a and 6b. EUL flow control involves three main parts. A first part is the actual EUL per-flow flow control 630 which—in similarity with the HSDPA embodiment of FIGS. 4 and 5—is managed from the RBS (Node B). A second part is the EUL scheduler 640 that also resides in the RBS and performs the actual EUL bit-rate reduction and increase operations from UE under control from the EUL per-flow flow control 630. A third part 610 of the EUL flow control resides in the SRNC and is responsible for detecting transport network layer congestion. Thus, EUL flow control involves detecting transport network layer congestion by the third part 610 in the SRNC, deciding upon EUL bit-rate reduction by the first part 630 in the RBS, and in response signaling by the EUL scheduler 640 in the RBS to the UE a Scheduling Grant Bit-rate which reflects the commanded EUL bit-rate reduction or subsequent EUL bit-rate increase after the congestion has ended. To this end, a parameter linearincreaseAbsBitrate is used in the EUL scheduler 640 when increasing the EUL bit-rate by an amount defined by linearIncreaseAbsBitrate, scaled with an RBR value eulRbr in accordance with the inventive concept. The RBR value eulRbr may be determined for a new EUL traffic flow like it is done for the HSDPA embodiments referred to above, e.g. by determining the SPI value for the new EUL traffic flow from the NBAP signaling with the SRNC during RAB setup, and then reading the RBR value from predefined cross-reference data, such as a QoS Mapping Table 301. The above will now be explained in more detail with reference to FIG. 6a. As seen at 601, an EUL traffic flow containing MAC-e data is received from a UE 100 over the Uu interface 118 in the RBS 114. Uplink data processing functionality 632 in the RBS demultiplexes the MAC-e data and sends it in E-DCH data frames 620 to the SRNC 112 over the transport network 119 (i.e. Iub/Iur interface 117). Transport network layer (TNL) congestion detection functionality 612 in the SRNC 112 investigates the flow of E-DCH data frames to detect congestions in the transport network 119. As is well known per se, different kinds of congestions may be detected, i.e. Soft Dynamic Delay (SCD), Hard Dynamic Delay (DDD) and Hard Frame Loss (FLD). When functionality 612 detects congestion, TNL Congestion Indication control frames 622 are sent to the RBS 114.

A flow control main algorithm 636 in the RBS 114 receives the TNL Congestion Indication control frames 622 from the SRNC 112. Based on the kind of congestion detected, the flow control main algorithm 636 decides upon a bit-rate reduction reduceEulBitrate, which is expressed as a percentage. For instance, a hard congestion may call for a larger bit-rate reduction (such as 50%) than a soft congestion (such as 10%). It is determined at 638 whether the current cell is the serving cell. If not, data frame dropping functionality 634 for non-service cell is invoked, wherein bit-rate reduction will be obtained by dropping E-DCH data frames, preferably long ones. If on the other hand the current cell is the serving cell, then bit-rate reduction functionality 642 in the EUL scheduler 640 is invoked.

The bit-rate reduction functionality 642 will use reduceEulBitrate to reflect a nominal bit-rate reduction, i.e. a reduction of the current EUL bit-rate with the percentage defined by reduceEulBitrate—in other words a multiplicative (or exponential) decrease (MD). UE bit-rate scheduling functionality 646 in the EUL scheduler 640 will use the nominal bit-rate reduction when determining a Scheduling Grant Rate 648 (FIG. 6b) to be signaled to the UE 100 as seen at 650 in FIG. 6a. To this end, the functionality 646 will consult a Scheduler Grant Table, which defines real bit-rate changes in steps of, e.g., 1 dB, and then decides upon the Scheduling Grant Rate 648 to be signaled to the UE 100 from the Scheduler Grant Table in view of the nominal bit-rate reduction. Other factors, such as if UE 100 is happy or not (cf UE Happy Bit at 647 in FIG. 6b), are also considered by the EUL scheduler 640.

Figure 6A:
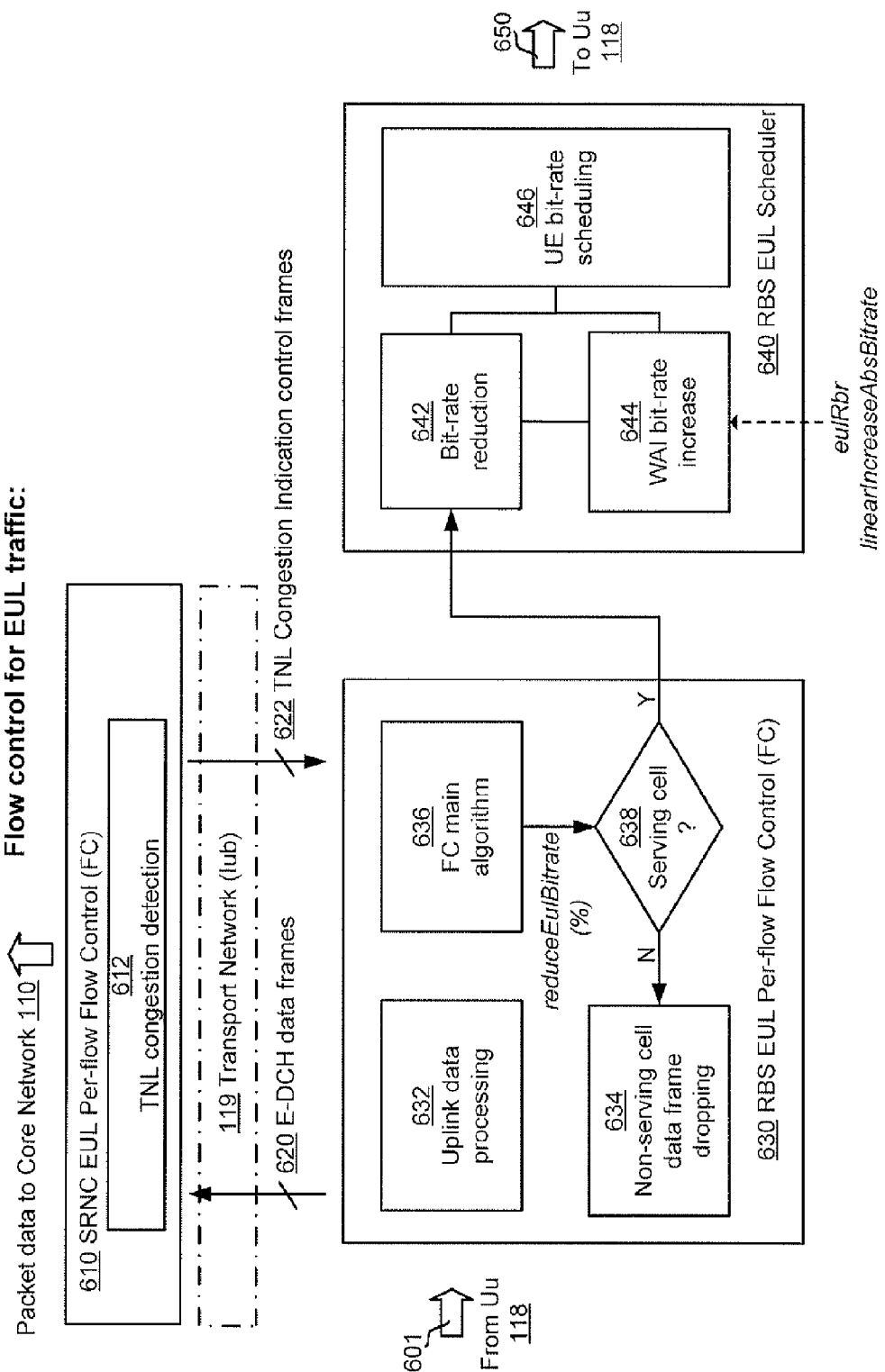
FIG. 6a discloses flow control in an EUL transport network according to one embodiment.
Figure 6B:
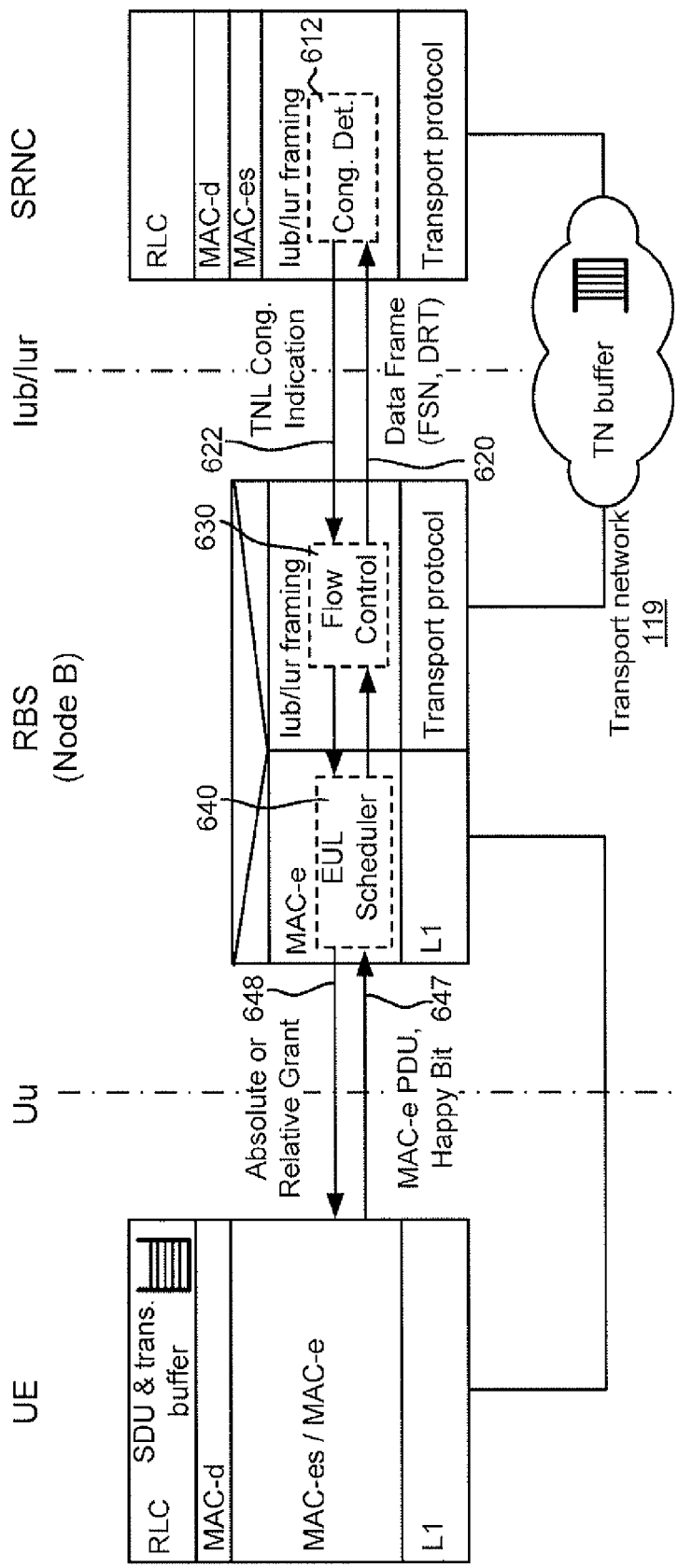
FIG. 6b illustrates an EUL flow control architecture and protocol stack.

The EUL bit-rate reduction is followed by one or more linear bit-rate increases, as indicated by WAI bit-rate increase functionality 644 in FIG. 6a. The WAI bit-rate increase functionality 644 operates on the aforementioned linearIncreaseAbsBitrate, which is a system constant, and scales it with the RBR value eulRbr to obtain RBR-based QoS profiling. In other words, when an EUL bit-rate increase is to be performed, the WAI bit-rate increase functionality 644 will determine a weighted additive bit-rate amount as eulRbr*linearIncreaseAbsBitrate. In response, the UE bit-rate scheduling functionality 646 in the EUL scheduler 640 will determine the Scheduling Grant Rate 648 in view of this weighted additive bit-rate amount, again with reference to the Scheduler Grant Table and UE Happy Bit, etc. As a result, after some iterations, the EUL bit-rate of the EUL traffic flow 601 in question will approach a value which reflects its RBR value eulRbr compared to other EUL traffic flows which share the same transport network bottleneck.

Thus, RBR-based QoS profiling is obtained which will favor higher-ranked subscription types over lower-ranked subscription types, as for the HSDPA embodiments. Likewise, as for the HSDPA embodiments, the RBR QoS profiling may be optional in this or other EUL embodiments, wherein the RBR value will be set to 100% if RBR QoS profiling is disabled, and thus have no effect on the EUL Flow Control. For further details about EUL Flow Control, reference is made to the available literature, for instance "Szilveszter Nadas, Zoltan Nagy and Sandor Racz, "HSUPA transport network congestion control", 2008, submitter for review for Globecom 2008 conference".

The invention has been described above in detail with reference to embodiments thereof. However, as is readily understood by those skilled in the art, other embodiments are equally possible within the scope of the present invention, as defined by the appended claims.

The invention claimed is:

1. A method for controlling the bandwidth shared among contending traffic flows that flow over a transport network between a radio network controller and a radio base station, the method comprising:
  determining a relative bit-rate (RBR) for each traffic flow, wherein said determining comprises:
    determining a priority indicator of each traffic flow, said priority indicator reflecting a subscription type of a user or user equipment associated with that traffic flow;
    determining the RBR of each traffic flow as a function of the respective priority indicator, by determining the RBR of that traffic flow from the respective priority indicator using prestored cross reference data; and
  controlling the bit-rates of said traffic flows using per-flow additive increase multiplicative decrease (AIMD) flow control, by subjecting each traffic flow to additive increase operations that depend on the RBR for that traffic flow.

2. The method according to claim 1, wherein said determining comprises determining an RBR for each traffic flow responsive to generation of that traffic flow.

3. The method according to claim 1, wherein determining a priority indicator of each traffic flow comprises deriving the priority indicator from Node B Application Part signaling between said radio network controller and said radio base station.

4. The method according to claim 1, wherein determining a priority indicator of each traffic flow comprises:
  receiving at the radio base station a High-Speed Downlink Shared Channel (HS-DSCH) data frame in the traffic flow from the radio network controller; and
  deriving the priority indicator from a Common Channel Priority Indicator data field in the received HS-DSCH data frame.

5. The method according to claim 1, wherein the prestored cross reference data is a QoS Mapping Table.

6. The method according to claim 5, wherein said QoS Mapping Table contains a plurality of RBR values for a corresponding plurality of values of said priority indicator within one transport network QoS differentiation class.

7. The method according to claim 5, wherein said QoS Mapping Table contains a first plurality of RBR values for a corresponding first plurality of values of said priority indicator within a first transport network QoS differentiation class, and wherein said QoS Mapping Table furthermore contains at least a second plurality of RBR values for a corresponding second plurality of values of said priority indicator within a second transport network QoS differentiation class.

8. The method according to claim 7, wherein said first plurality of RBR values are identical to said second plurality of RBR values.

9. The method according to claim 1, wherein said contending traffic flows belong to the same transport network QoS differentiation class.

10. The method according to claim 1, wherein subjecting each traffic flow to additive increase operations comprises increasing the current bit-rate of each traffic flow by a predetermined increment, scaled by the determined RBR of the respective traffic flow, so as to obtain proportional fair bandwidth sharing between said traffic flows in a congestion avoidance state.

11. The method according to claim 1, further comprising determining an initial bit-rate of at least one traffic flow using the RBR determined for that traffic flow.

12. The method according to claim 1, wherein the RBR represents a scale value that is a percentage of the nominal bit-rate for a traffic flow within a given transport network QoS differentiation class.

13. The method according to claim 1, wherein the method is performed by a High Speed Downlink Packet Access rate-based per-flow flow controller.

14. The method according to claim 1, wherein the method is performed by an enhanced uplink flow controller.

15. A node for a telecommunication system that includes a radio network controller connected via a transport network to one or more radio base stations, said node comprising a flow controller configured to control the bandwidth shared among contending traffic flows that flow over said transport network, by:
    determining a relative bit-rate (RBR) for each traffic flow, wherein the flow controller is configured to determine the RBR for each traffic flow by:
        determining a priority indicator of each traffic flow, said priority indicator reflecting a subscription type of a user or user equipment associated with that traffic flow;
        determining the RBR of each traffic flow as a function of the respective priority indicator, by determining the RBR of that traffic flow from the respective priority indicator using prestored cross reference data; and
    controlling the bit-rates of said traffic flows using per-flow additive increase multiplicative decrease (AIMD) flow control, by subjecting each traffic flow to additive increase operations that depend on the RBR for that traffic flow.

16. The node according to claim 15, wherein said node is one of said radio base stations.

17. The node according to claim 15, wherein the flow controller is configured to determine an RBR for each traffic flow responsive to generation of that traffic flow.

18. The node according to claim 15, wherein the flow controller is configured to determine a priority indicator of each traffic flow by deriving the priority indicator from Node B Application Part signaling between said radio network controller and said radio base station.

19. The node according to claim 15, wherein the flow controller is configured to determine a priority indicator of each traffic flow by:
    receiving a High-Speed Downlink Shared Channel (HS-DSCH) data frame in the traffic flow from the radio network controller; and
    deriving the priority indicator from a Common Channel Priority Indicator data field in the received HS-DSCH data frame.

20. The node according to claim 15, wherein the prestored cross reference data is a QoS Mapping Table.

21. The node according to claim 20, wherein said QoS Mapping Table contains a plurality of RBR values for a corresponding plurality of values of said priority indicator within one transport network QoS differentiation class.

22. The node according to claim 20, wherein said QoS Mapping Table contains a first plurality of RBR values for a corresponding first plurality of values of said priority indicator within a first transport network QoS differentiation class, and wherein said QoS Mapping Table furthermore contains at least a second plurality of RBR values for a corresponding second plurality of values of said priority indicator within a second transport network QoS differentiation class.

23. The node according to claim 15, wherein said first plurality of RBR values are identical to said second plurality of RBR values.

24. The node according to claim 15, wherein said contending traffic flows belong to the same transport network QoS differentiation class.

25. The node according to claim 15, wherein the flow controller is configured to subject each traffic flow to additive increase operations by increasing the current bit-rate of each traffic flow by a predetermined increment, scaled by the determined RBR of the respective traffic flow, so as to obtain proportional fair bandwidth sharing between said traffic flows in a congestion avoidance state.

26. The node according to claim 15, wherein the flow controller is further configured to determine an initial bit-rate of at least one traffic flow using the RBR determined for that traffic flow.

27. The node according to claim 15, wherein the RBR represents a scale value that is a percentage of the nominal bit-rate for a traffic flow within a given transport network QoS differentiation class.

28. A telecommunication system comprising a radio network controller that is connected to a node via a transport network, wherein the node comprises a flow controller configured to control the bandwidth shared among contending traffic flows that flow over said transport network, based on being configured to:
    determine a relative bit-rate (RBR) for each traffic flow, wherein the flow controller is further configured to:
        determine a priority indicator of each traffic flow, said priority indicator reflecting a subscription type of a user or user equipment associated with that traffic flow;
        determine the RBR of each traffic flow as a function of the respective priority indicator, by determining the RBR of that traffic flow from the respective priority indicator using prestored cross reference data; and
    control the bit-rates of said traffic flows using per-flow additive increase multiplicative decrease (AIMD) flow control, by subjecting each traffic flow to additive increase operations that depend on the RBR for that traffic flow.

\* \* \* \* \*